April 12, 1966     D. F. WIDMAYER     3,246,165

METHOD AND CIRCUIT FOR STATIC CONTROL OF A.C. POWER

Filed Dec. 21, 1961     2 Sheets-Sheet 1

INVENTOR.
DON F. WIDMAYER
BY
ATTORNEYS

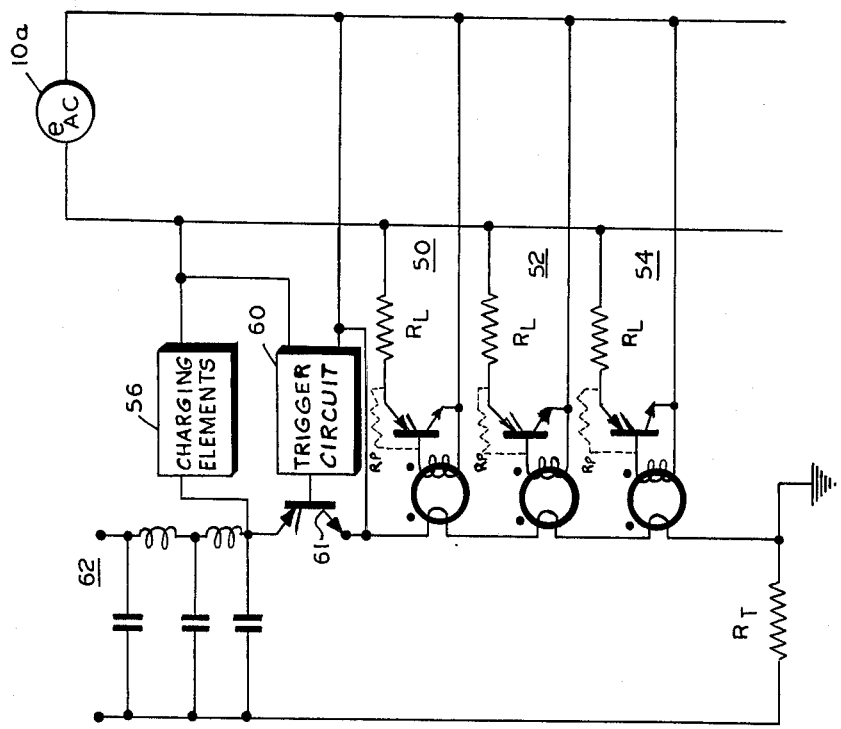

United States Patent Office 3,246,165
Patented Apr. 12, 1966

3,246,165
METHOD AND CIRCUIT FOR STATIC CONTROL OF A.C. POWER
Don F. Widmayer, Bethesda, Md., assignor, by mesne assignments, to Darco, Incorporated, Kensington, Md., a corporation of Maryland
Filed Dec. 21, 1961, Ser. No. 160,975
5 Claims. (Cl. 307—88)

The invention relates to static electrical switching circuits and specifically to such gating circuits for information processing systems. The power level of operation is dependent only on the power handling capacity of the semiconductor regenerative switch.

The invention relates particularly to a core switching circuit responsive to bi-state signals being applied to the switch for actuation thereof, in which the switch comprises a multi-aperture, square loop ferrite magnetic core in circuit relation with a regenerative switching semiconductor for controlling the application of power from an alternating voltage source to the desired load device. More particularly, the invention relates to an improved control signal generation means for triggering regenerative switching semiconductors.

Further, the invention relates to a multi-aperture saturable core device and a regenerative switching semiconductor interconnected in a circuit for selectively at predetermined periods enabling the regenerative switch to be triggered by pulsing the saturable core by the flux about the minor aperture of the device for switching to a load the power from an alternating current source in phase relationship with the pulsing of the saturable core so that a portion of the alternating cycle of the source is delivered in accordance with the information stored within the saturable core device.

The switching circuits of the invention have a number of desirable advantages including rapid generation of a half-wave output or portion thereof to a load device when an interrogating pulse has been applied to the core switching circuit. The overall switch including the core device and the regenerative semiconductor device is regenerative in character by continuing to function so that the information that is derived from the saturable core device and coupled into the load device through the regenerative switching semiconductor device is restored into the core by the combined nature of the overall switch circuit, including the semiconductor device in conjunction with the reverse half-cycle of the alternating current.

The magnetic core is advantageously of a material having a square loop characteristic, but, of course, may be of other various materials in differing embodiments of the invention.

When an interrogate pulse is applied to the magnetic core, current due to the occurrence of the pulse and the coincidence of a half-cycle of the alternating current that would render the semiconductor conductive, provides switching of the stored information to the load device as long as the switch is conductive. When the interrogate pulse terminates, the regenerative semiconductor switch continues to conduct for the balance of the same half-cycle of the alternating current source. This conduction of the same half-cycle may be employed for restoring the stored information to the core until subsequent interrogation thereof, or alternatively the following negative half-cycle may be utilized for this purpose.

A further and complete understanding of the invention may be had from the following description of particular embodiments of the invention. In the description reference is made to the accompanying drawings of which:

FIG. 4 is a circuit diagram of a further embodiment of the invention including a plurality of switch arrangements for providing information to any of several load devices.

Figure 1:
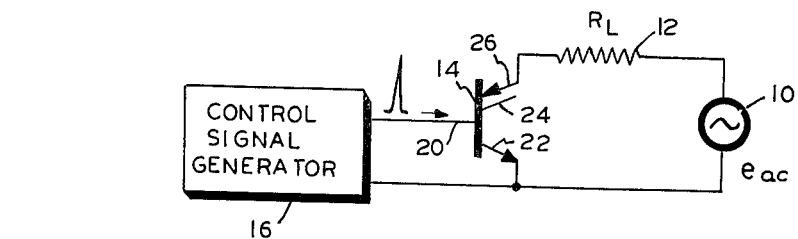
FIG. 1 is a schematic and block diagram of an A.C. power control arrangement employing a regenerative switching semiconductor device means.

Referring now to the drawings, there is shown in FIG. 1 an A.C. source 10 for energizing a load 12 when a regenerative switching semiconductor 14 is rendered conductive by triggering pulses applied from a control signal generator 16. The semiconductor 14 is a regenerative switching semiconductor such as a silicon control rectifier, a PNPN switch, a transistor or a controlled switch of composite NPN-PNP transistor configuration.

In the field of handling digital data, particularly with respect to numerous output functions, such as printer bar operation, indicator displays using electromechanical components, and the like, it is essential to provide these outputs with a relatively long-term power flow from a very short duration signal. The load device 12 of FIG. 1 will draw current for the remainder of the half-cycle coincident with the trigger pulse.

The semiconductor 14 may be a composite transistor structure of alloy junction types, or of the PNPN or the NPNP type. The PNPN transistor is comprised of a base 20 and an emitter 22, which together form a path for a signal applied to the semiconductor; the semiconductor also includes a collector 24 and a further emitter 26. The emitter 26 and the base 20 comprise a current path when the semiconductor is in the low impedance state, so that current from the signal generator which has triggered the semiconductor to a low impedance state upon concurrence of the conductive half-cycle of the A.C. source 10 will thereby pass current of the A.C. source 10 through the load 12 and the semiconductor 14.

Figure 2:
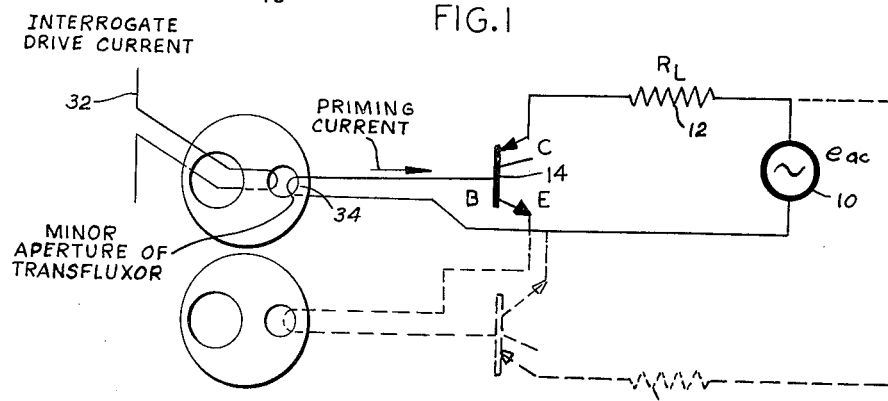
FIG. 2 is a schematic diagram of a control signal generator switch embodying the preferred features of the present invention.

In FIG. 2 a preferred embodiment of the invention is shown in which the control signal generator means is a minor aperture 30 of a transfluxor having an interrogating winding 32 and an output winding 34. The interrogating winding is driven by an interrogating drive or pulse from a source or generator (not shown). Preferably the interrogate pulse applied to the interrogate winding is synchronized to the zero phase angle of the current of the A.C. source; otherwise stated, the interrogate pulse is synchronized to the zero phase angle or the first instant of the conductive half-wave cycle of the voltage wave applied to the semiconductor 14. However, by employing D.C. biasing techniques in the pulse forming network 60 like that shown in FIG. 4, the trigger pulse can be made to lag the zero phase angle to achieve an ON time of the regenerative semiconductor switch other than the full half-wave cycle of the A.C. source.

Figure 2A:
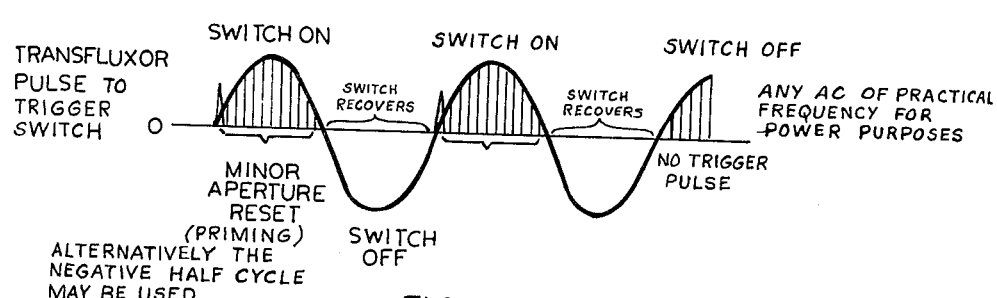
FIG. 2A is a time-wave diagram illustrating the relationships of the information pulse in response to interrogation of the core and the A.C. characteristics of the power supply to the load.

The output winding of the transfluxor provides a pulse that turns the semiconductor to a conductive or low impedance state or, as the semiconductor is considered a switch, the switch is turned ON. As described above in connection with FIG. 1, the switch is maintained ON for the balance of the conductive half-cycle after the pulse from the output winding of the transfluxor is no longer present and applied to the switch. This corresponds to a memory function in the regenerative semiconductor switch. The current path through the switch may be uniquely useful in restoring or priming the state of the transfluxor to its initial condition by means of an additional winding through the minor aperture connected in series with the A.C. source and semiconductor. The energy of the prime current is from the A.C. source 10 and continues for the remainder of the conductive half-cycle or alternatively during the negative half-cycle, as is pictorially demonstrated in FIG. 2A. Whereas the memory of the semiconductor switch is considered an active state memory while the switch is ON, the transfluxor has a passive state memory during the second half of the cycle of the A.C. source, i.e., during the non-conductive half-cycle, as shown in FIG. 2A. During the conductive half-cycle, the changed localized condition of the transfluxor, sensed by the interrogating pulse through the minor aperture, may be reset by the load current flowing through an additional winding. Another alternative embodiment of the invention is to provide a separately applied D.C. bias to the transfluxor minor aperture to affect priming of the transfluxor. The transfluxor pulse to trigger the semiconductor switch, as shown in FIG. 2A, may be triggered at points in the switch conducting half-wave cycle other than the zero phase point, i.e., from 0° to 180°, by applying conventional D.C. biasing techniques in the pulse forming network 60, shown in FIG. 4, to achieve a load ON time-interval other than the full time-interval of the half-wave cycle. Alternatively, to achieve an incremental load ON time-interval other than the full ON time-interval of the pulse forming network power source without using D.C. biasing techniques, a separate A.C. power source for the semiconductor regenerative switches 50, 52, 54 of a higher multiple frequency than the pulse forming frequency source may be applied so long as the zero phase angle of the two A.C. waves are synchronized at predetermined times related to the multiple frequency. For example, a 20 cycle load source and a 70 cycle wave pulse forming source would be zero phase-synchronized if begun simultaneously at every seven cycles of the 70 cycle source.

The flux state conditions of transfluxors about the minor aperture, and sensing of the memory state thereof, are well-known by operation on the major and minor apertures as described by Rajchman and Lo, The Transfluxor, IRE, November 1956.

Figure 3:
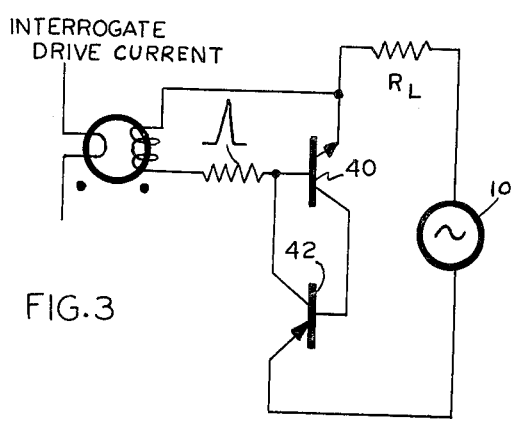
FIG. 3 is an alternative arrangement of the switch in accordance with another embodiment of the present invention.

In FIG. 3 is shown an alternative arrangement using a PNP and an NPN transistor 40, 42 in circuit relation to each other in which the collectors and bases are coupled together forming a regenerative semiconductor switch means.

The interrogating pulse may be achievd in any desired method of generating synchronizing pulses. However, FIG. 4 is a detailed arrangement of a circuit for achieving the interrogating pulse for the core-switch circuit.

The minor aperture transfluxor semiconductor regenerative switches 50, 52, 54 are shown in FIGURE 4, and operate similarly to the core switch of FIGURE 2.

A charging element 56 may be a resonant charging circuit energized and synchronized with the A.C. current source 10a.

The trigger circuit or pulse forming network 60 may be comprised of a square loop core-switch for gating a regenerative semiconductor switch 61 so that the instantaneous discharge of a pulse forming network 62 provides a surge of current functioning to interrogate the minor aperture saturable cores associated with regenerative switches 50, 52, 54.

FIGURE 4 further illustrates the manner in which a number of any plurality can be paralleled to one pulse forming network and one A.C. current source 10a for an application requiring a multitude of readouts such as lamp displays, or readout punches, or printer bar solenoids, in data processing equipment and other applications of selectively energizing plural loads.

It is understood that the above-described arrangements are complete and illustrative of the embodiments of the principles of the invention. Numerous other arrangements than those shown may be devised by those skilled in the art within the scope of the invention without departing from the spirit thereof.

What is claimed is:

1. A switching circuit comprising terminals for connection to an alternating current source, semiconductor means having signal receiving terminals and load connecting terminals, means connecting in series the semiconductor means, the alternating current source terminals, and the load connecting terminals, a minor aperture of a multi-apertured device including a winding about the minor aperture thereof, means connecting the winding and the signal receiving terminals of the semiconductor means in series, an interrogator winding for said minor aperture, means supplying interrogating signal to said interrogator winding of the said minor aperture, said winding producing an output of the stored information to the semiconductor means in response to said interrogating signal and also receiving a priming current from said semiconductor.

2. A switching circuit comprising terminals for connection to an alternating current source, semiconductor means having signal receiving terminals and load connecting terminals, means connecting in series the semiconductor means, the alternating current source terminals, and the load connecting terminals, a minor aperture of a multi-apertured device including a winding about the minor aperture, means connecting the winding and the signal receiving terminals of the semiconductor means in series, an interrogator winding for said minor aperture for supplying interrogating signal to the minor aperture, said winding producing an output of the stored information to the semiconductor means in response to the interrogating signal, means for priming said minor aperture including said semiconductor when continuing to conduct current after termination of the interrogating signal while the alternating voltage wave connected to the A.C. source terminals tends to render the semiconductor means conductive.

3. The invention of claim 2 including means for priming said minor aperture on the succeeding half-cycle of said A.C. source including said connecting means for said winding and the signal receiving terminals of the semiconductor.

4. A switching circuit comprising an alternating current source, a semiconductor means having signal receiving terminals and load connecting terminals, means connecting in series the load, the alternating current source, and the semiconductor means, a minor aperture of a multi-apertured device including a winding about the minor aperture, means connecting the winding and the signal receiving terminals of the semiconductor means in series for actuating the semiconductor and for priming the transfluxor or the minor aperture thereof, an interrogator winding for the minor aperture and means supplying interrogating signal to said minor aperture, said minor aperture winding producing an output of the stored information to said semiconductor means in response to the interrogating signal, said semiconductor means conducting current upon coincidence of the alternating voltage wave tending to render the semiconductor means conductive in phase relation to the interrogating signal, and said semiconductor being non-conductive while the alternating voltage wave tends to render the semiconductor non-conductive.

5. A switch circuit comprising an alternating current source of a first frequency, a semiconductor means having signal receiving terminals and load connecting terminals, series connection means for the load, the alternating current source and the semiconductor means, a minor aperture of a multi-apertured device including a winding about the minor aperture, means connecting the winding and the signal receiving terminals of the semiconductor means in series for connecting a priming signal from the semiconductor to said winding, an interrogation winding for the minor aperture, and means supplying interrogating signal of a second frequency having a zero phase relationship to the first frequency at a predetermined recurring rate to said minor aperture, said minor aperture winding producing an output of the stored information to said semiconductor means in response to the interrogating signal, and said semiconductor being biased non-conductive by the alternating voltage wave tending to render the semiconductor non-conductive.

References Cited by the Examiner

UNITED STATES PATENTS

| | | | |
|---|---|---|---|
| 2,993,197 | 7/1961 | Broadbent | 340—174 |
| 3,018,383 | 1/1962 | Ellert | 307—88.5 |

OTHER REFERENCES

Pages 321–332, March 1956, Publication I, The Proceedings of the IRE.

September 1960, Publication II, Solid State Products: A Survey of Some Circuit Applications of the Silicon Controlled Switch and Silicon Controlled Rectifier.

IRVING L. SRAGOW, *Primary Examiner.*